(12) United States Patent
Tashiro

(10) Patent No.: US 7,425,813 B2
(45) Date of Patent: Sep. 16, 2008

(54) BATTERY PACK AND FUNCTION EXPANSION CARTRIDGE

(75) Inventor: Kei Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 318 days.

(21) Appl. No.: 10/839,035

(22) Filed: May 5, 2004

(65) Prior Publication Data

US 2005/0001585 A1 Jan. 6, 2005

(30) Foreign Application Priority Data

May 7, 2003 (JP) .............................. 2003-129090

(51) Int. Cl.
*H02J 7/00* (2006.01)
(52) U.S. Cl. .................... 320/112; 320/107; 320/114
(58) Field of Classification Search ......... 320/107–115, 320/132
See application file for complete search history.

(56) References Cited

U.S. PATENT DOCUMENTS

| | | | | |
|---|---|---|---|---|
| 5,541,985 A | * | 7/1996 | Ishii et al. | ................... 379/111 |
| 5,982,141 A | * | 11/1999 | Hinohara | .................... 320/113 |
| 6,244,894 B1 | * | 6/2001 | Miyashita | ................... 439/500 |
| 6,392,383 B1 | * | 5/2002 | Takimoto et al. | ............ 320/115 |
| 6,509,717 B2 | * | 1/2003 | Lee | ............................. 320/116 |
| 6,931,266 B2 | * | 8/2005 | Miyoshi et al. | ............. 455/572 |

* cited by examiner

*Primary Examiner*—Akm Enayet Ullah
*Assistant Examiner*—Richard V Muralidar
(74) *Attorney, Agent, or Firm*—Frommer Lawrence & Haug LLP; William S. Frommer; Thomas F. Presson

(57) ABSTRACT

A battery pack includes a cartridge insertion section to which a cartridge having a function expansion device for expanding the functions of an electronic device can be inserted; a function expansion terminal for connection with the cartridge inserted into the cartridge insertion section; and an expansion function operation device for operating the function expansion device of the cartridge connected to the function expansion terminal in accordance with a control signal of the electronic device. A function expansion cartridge includes connection terminals for connection with predetermined terminals provided in the slot of the battery pack; a communication device for performing data communication with the electronic device via the connection terminals; a function expansion device having hardware and/or software for expanding the functions of the electronic device; and an expansion function control device for controlling the function expansion device in accordance with a control signal from the electronic device.

7 Claims, 8 Drawing Sheets

BATTERY PACK AND FUNCTION EXPANSION CARTRIDGE

BACKGROUND OF THE INVENTION

1. Field of the Invention

The present invention relates to a battery pack and a function expansion cartridge. More particularly, the present invention relates to a battery pack having a configuration capable of expanding the functions of an electronic device and to a function expansion cartridge that is set in this battery pack for expanding the functions of the electronic device.

2. Description of the Related Art

In conventional technology, an electronic device is provided with an expansion terminal (hot shoe) or an expansion slot for expanding the functions of the device, and so on, and by installing a function expansion device or cartridge, etc., in the terminal and the slot, the functions of the device at the time of purchase can be expanded further.

For example, in the case of a video camera, a light can be mounted in a contact terminal called a "hot shoe".

Electronic devices, such as video cameras, can be driven with a capacitor which can be charged repeatedly by a charger (hereinafter referred to as a "battery pack") being loaded therein so that it can be used outdoors or anywhere the user goes.

A video camera has been developed in which a mechanism for loading and removing a memory card is provided on the battery pack side, so that data to be processed in the electronic device driven by the battery pack in this manner, for example, image data captured by a video camera, is recorded, so that the image data can be recorded in the memory card set in the battery pack (for example, see Japanese Unexamined Patent Application Publication No. 2001-78068 (page 4, FIG. 1)).

However, the current situation is that, in such electronic devices, usually, basic functions are determined in advance, and it is often not known whether the functions are really necessary functions unless these are actually used; therefore, careful consideration is necessary when purchasing, with the result that users cannot but help to buy electronic devices provided with functions which are unnecessary and, on the other hand, electronic devices having insufficient functions. Moreover, when unnecessary functions are provided, there are problems in that the device's main unit becomes enlarged correspondingly, the portability is degraded, and the purchase price increases.

Furthermore, in electronic devices provided with the above-described expansion terminal (hot shoe) and expansion slot, the functions which can be added are often limited. Furthermore, since mechanisms such as an expansion terminal (hot shoe) and an expansion slot must be provided in the device's main unit, the configuration becomes complex, and this becomes an obstacle to size reduction of the device in the same manner as for the above-described problems.

On the other hand, in the video camera of Japanese Unexamined Patent Application Publication No. 2001-78068 described above, a mechanism by which a memory card is loaded and removed is provided on the battery pack side, but the functions of the device are not expanded.

SUMMARY OF THE INVENTION

Accordingly, an object of the present invention is to provide a battery pack having a configuration capable of simply and easily expanding desired functions with respect to an electronic device.

To achieve the above-mentioned object, in one aspect, the present invention provides a battery pack including: connection terminals, which are connected to an electronic device, for supplying electrical power to the device, and which are connected to a charger so as to charge the battery pack; a communication terminal for performing data communication with the electronic device; a cartridge insertion section to which a cartridge having function expansion means for expanding the functions of the electronic device can be inserted; a function expansion terminal for connection with the cartridge inserted into the cartridge insertion section; and expansion function operation means for operating the function expansion means of the cartridge connected to the function expansion terminal in accordance with a control signal of the electronic device, which is sent via the communication terminal.

In the battery pack of the present invention, information on the electrical power capacity of the battery pack may be transmitted via the communication terminal.

In another aspect, the present invention provides a function expansion cartridge which operates by being inserted into a slot provided in a battery pack which supplies electrical power to an electronic device and which is capable of data communication with the electronic device, the function expansion cartridge including: connection terminals for connection with predetermined terminals provided in the slot of the battery pack; communication means for performing data communication with the electronic device via the connection terminals; function expansion means having hardware and/or software for expanding the functions of the electronic device; and expansion function control means for controlling the function expansion means in accordance with a control signal from the electronic device, which is sent via the communication means.

With such a configuration, when the function expansion cartridge is inserted into the cartridge insertion section (slot) provided in the battery pack, the function expansion terminal of the battery pack is connected to the connection terminal of the function expansion cartridge, so that, when the battery pack having the inserted function expansion cartridge is loaded, data communication becomes possible between the electronic device and the function expansion cartridge.

Then, the function expansion operation means of the battery pack controls the function expansion control means of the function expansion cartridge in accordance with a control signal from the electronic device so as to operate the hardware and the software of the function expansion means, making it possible to expand the functions of the electronic device.

As described in the foregoing, superior advantages can be obtained in that the functions of the electronic device can be simply and easily expanded by inserting a function expansion cartridge having a desired function into the cartridge insertion section (slot) of the battery pack and by loading the battery pack having the inserted function expansion cartridge into the electronic device. Furthermore, another advantage can be obtained in that only those functions which are necessary for the user can be selected and added later.

Furthermore, the configuration is formed in such a way that, when the function expansion cartridge is inserted into the cartridge insertion section (slot) provided in the battery pack, the function expansion terminal of the battery pack is connected to the connection terminal of the function expansion cartridge, and when the battery pack having the inserted function expansion cartridge is loaded into the electronic device, data communication is performed between the electronic device and the function expansion cartridge, and the same connection terminals and communication terminal as the conventional terminals can also be used between the electronic device and the battery pack. Consequently, there are advantages in that the manufacturing cost can be reduced, and the battery pack can also be used in an electronic device in which a conventional battery pack is used.

Furthermore, the battery pack having the inserted function expansion cartridge is loaded into the electronic device, and in accordance with a control signal from the electronic device, the expansion function operation means of the battery pack controls the expansion function control means of the function expansion cartridge in order to cause the hardware and the software of the function expansion means to operate, thus making it possible to expand the functions of the electronic device. Therefore, since the electronic device needs only to install the basic functions, an expansion terminal, an expansion slot, and hardware and software for expanding functions are not necessary, presenting superior advantages in that the size of the device can be reduced, and the cost can be reduced.

DESCRIPTION OF THE PREFERRED EMBODIMENTS

Embodiments of a battery pack and a function expansion cartridge according to the present invention will now be described below with reference to the drawings. However, the drawings are for explanation only, and do not limit the technical scope of the present invention.

Figure 1:
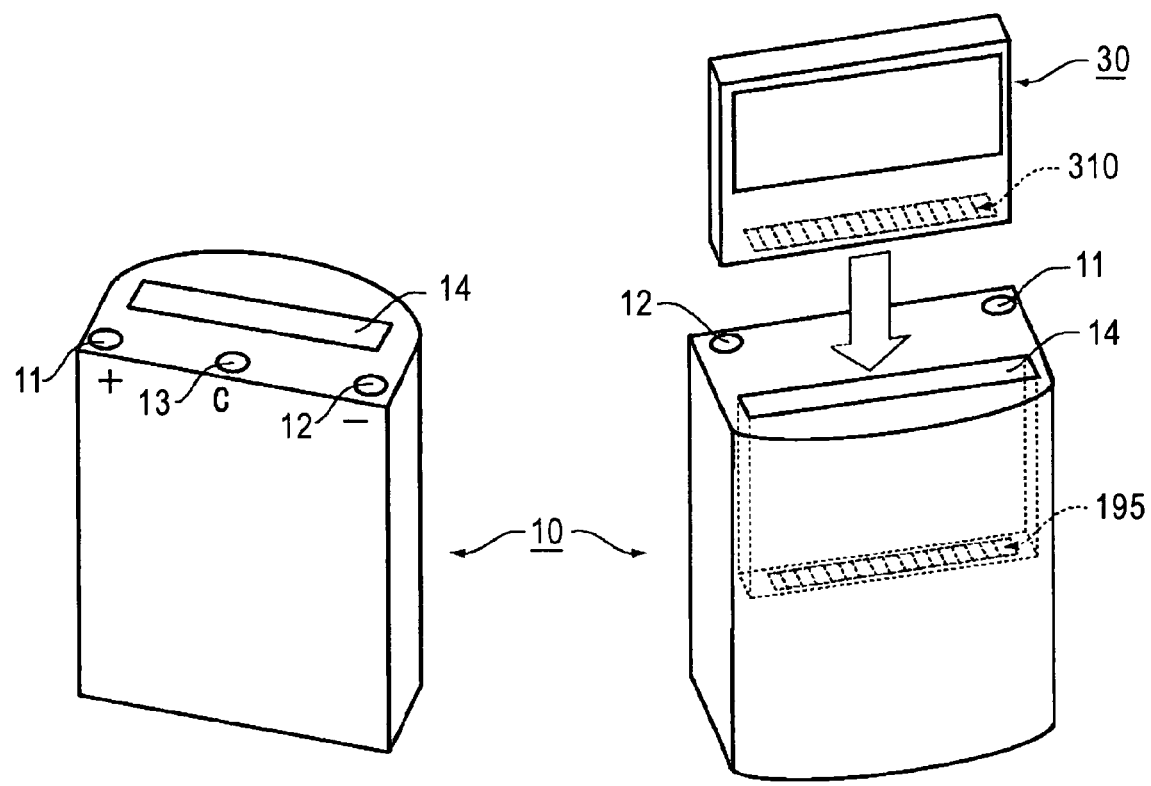
FIG. 1 is an exterior view showing an example of a battery pack and a function expansion cartridge according to the present invention.

FIG. 1 is an exterior view of a battery pack 10 and a function expansion cartridge 30.

The battery pack 10 includes a plus (+) terminal 11 and a minus (−) terminal 12, which are connected to an electronic device, for supplying electrical power to the device and which are connected to a charger (not shown) so as to charge the battery pack 10, and a communication terminal 13 for performing data communication with the electronic device, a slot 14 for setting the function expansion cartridge 30, and a function expansion terminal 195 for connection to a connection terminal 310 of the function expansion cartridge 30 inserted into the slot 14.

The function expansion cartridge 30, in which the expansion functions of the electronic device are incorporated, includes the connection terminal 310 for connection with the function expansion terminal 195 of the battery pack 10, so that, by inserting the connection terminal 310 to the slot 14 of the battery pack 10, the expansion functions are provided to the electronic device.

Figure 2:
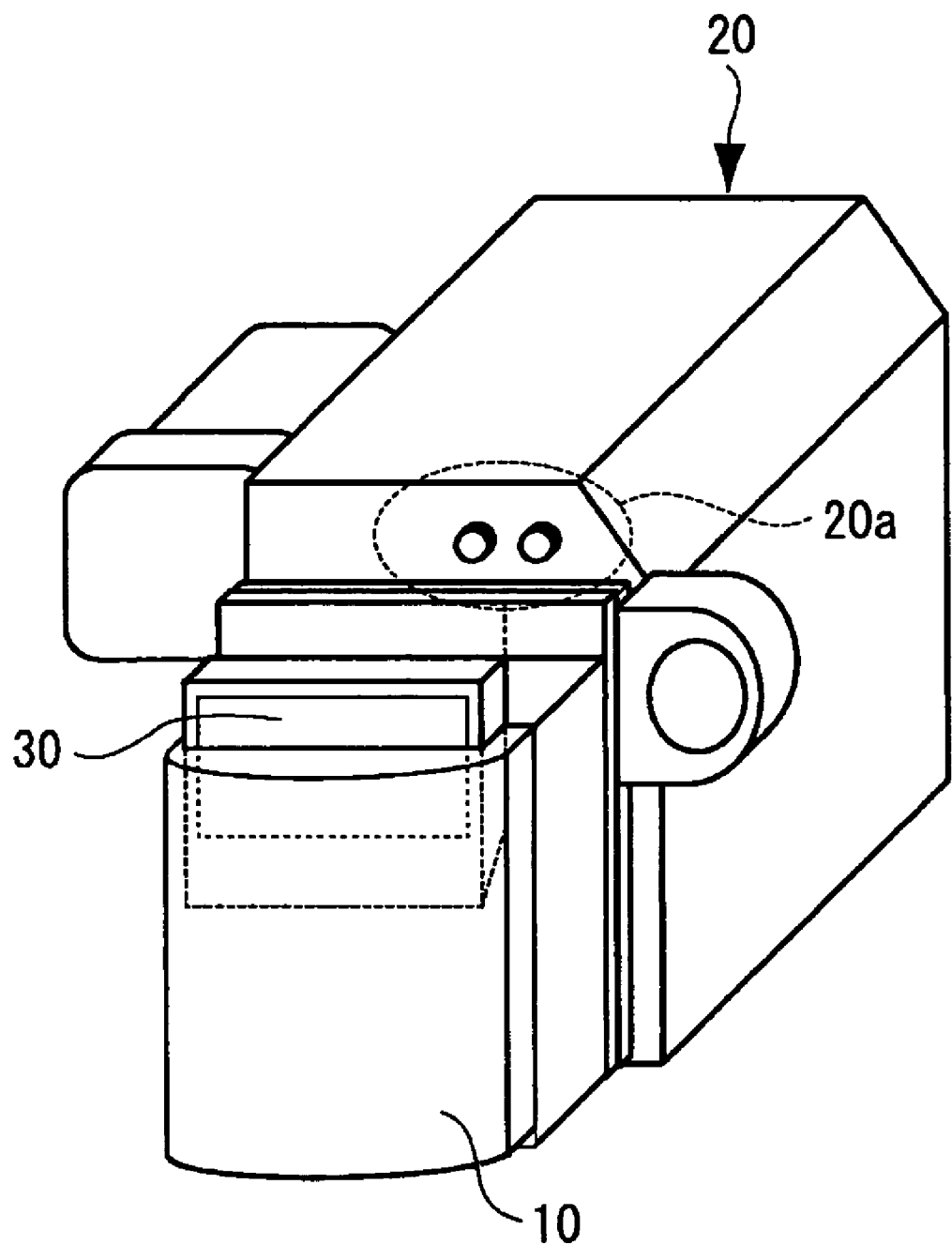
FIG. 2 is an exterior view when the battery pack in which the function expansion cartridge according to the present invention is set is loaded into an electronic device (image capturing device)

FIG. 2 is an exterior view when the battery pack 10 in which the function expansion cartridge 30 is set is loaded into an image capturing device 20, which is an electronic device. The loaded state and the operating state of the function expansion cartridge 30 can be indicated by an indicator 20a, such as an LED, provided in the image capturing device 20.

Figure 3:
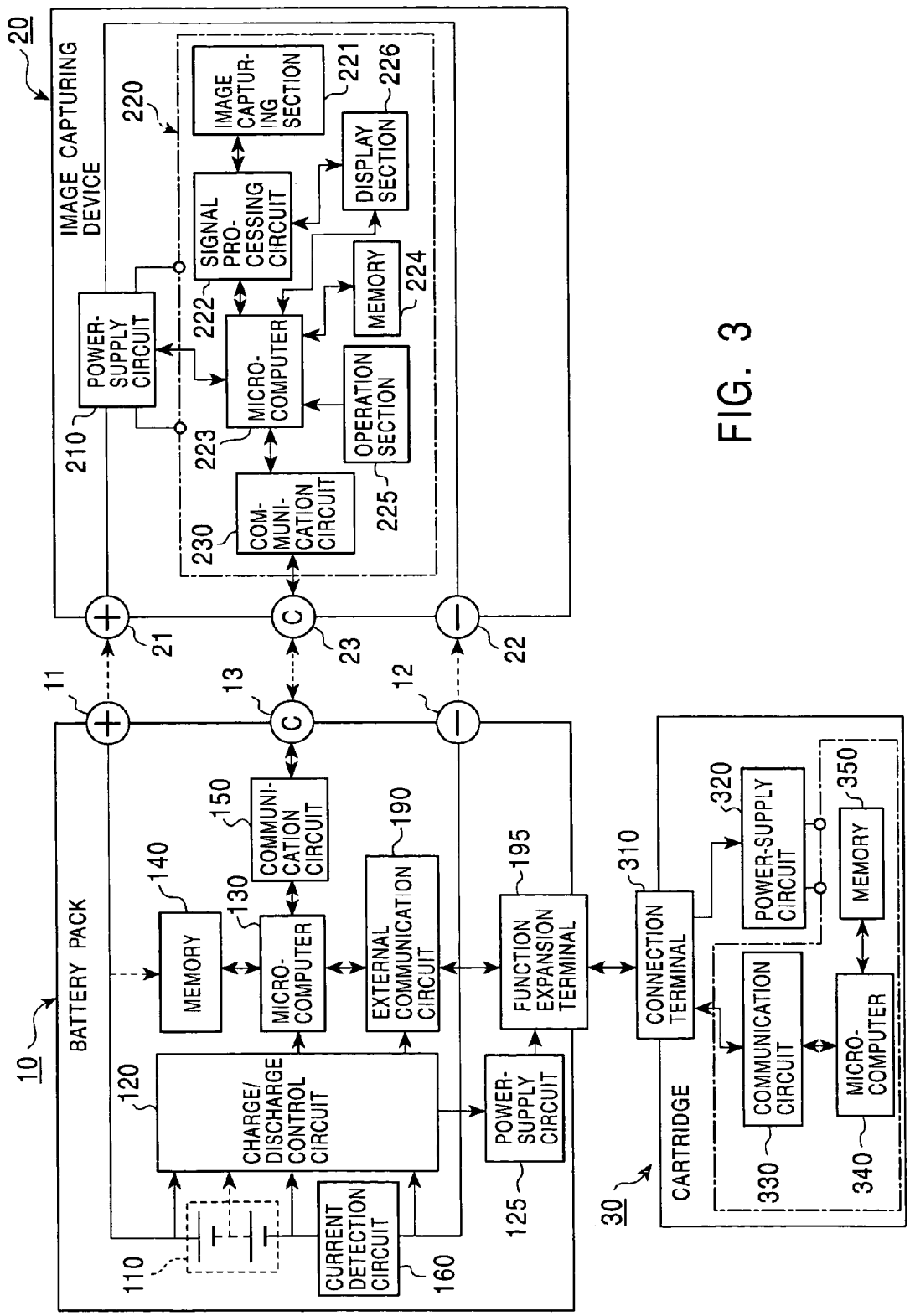
FIG. 3 is a block diagram showing, in a simplified manner, the connected state of the battery pack and the electronic device in the exterior view shown in FIG. 2.

FIG. 3 is a block diagram showing, in a simplified manner, the connected state when the battery pack 10 in which the function expansion cartridge 30 shown in FIG. 2 is set is loaded into the image capturing device 20, which is an electronic device.

Figure 4:
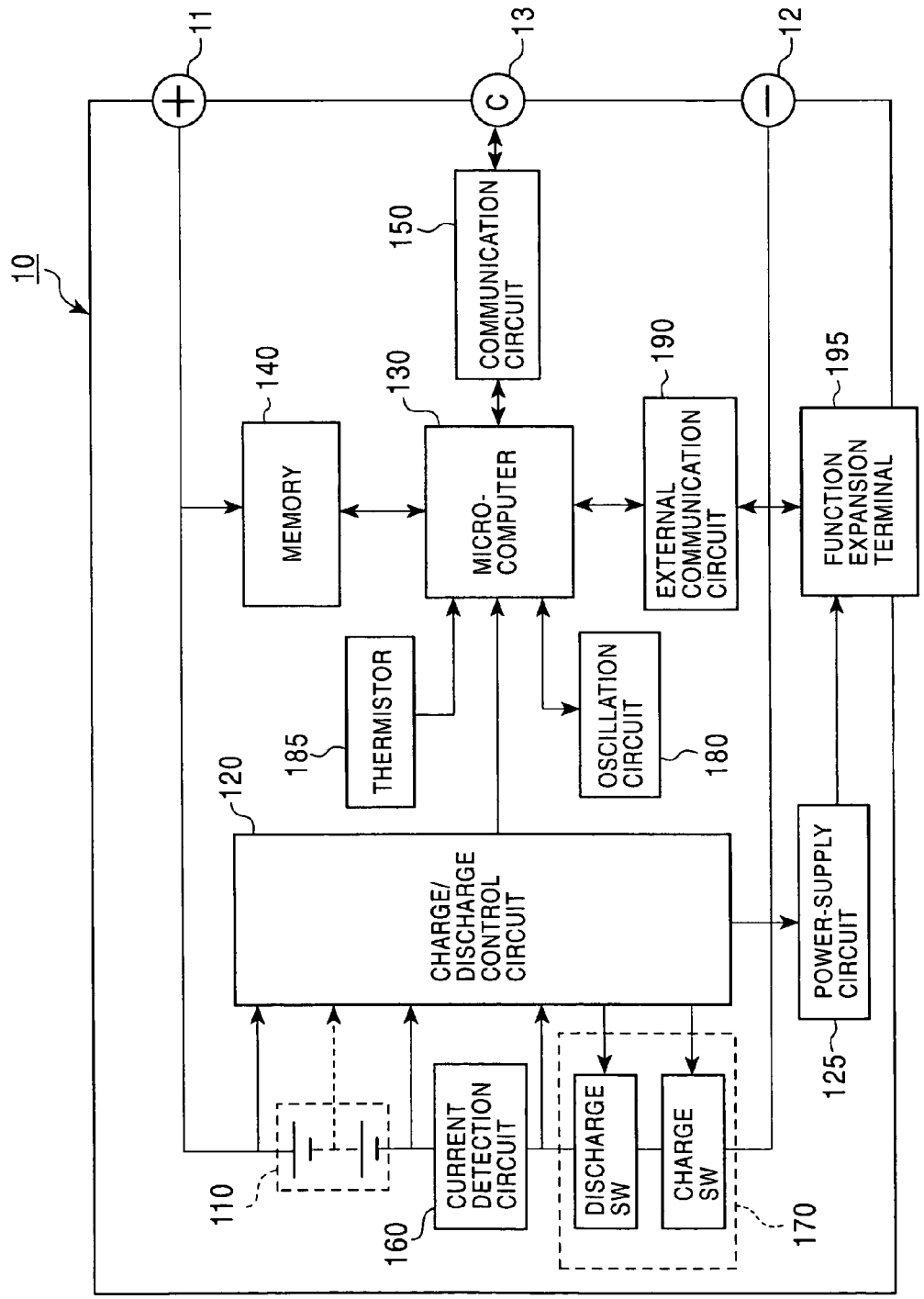
FIG. 4 is a block diagram showing the internal configuration of the battery pack 10 in the block diagram shown in FIG. 3.

The battery pack 10 will be described first. FIG. 4 is a block diagram showing the internal configuration of the battery pack 10 in the block diagram shown in FIG. 3. The battery pack 10 includes a battery cell 110, a charge/discharge control circuit 120, a power-supply circuit 125, a microcomputer 130, a memory 140, a communication circuit 150, a current detection circuit 160, a charge/discharge control switch 170, an oscillation circuit 180, a thermistor 185, an external communication circuit 190, a function expansion terminal 195, and so on.

The battery cell 110 is charged from the charger (not shown) via the plus (+) terminal 11 and the minus (−) terminal 12 in accordance with the charge/discharge control switch 170, and supplies electrical power to the loaded electronic device and each section of the battery pack 10.

The charge/discharge control circuit 120 controls the charge/discharge control switch 170, collects the information on the electrical current value detected by the current detection circuit 160 and the electrical power capacity of the battery cell 110 (hereinafter referred to as "battery cell information"), and sends the information to the microcomputer 130. Furthermore, the charge/discharge control circuit 120 controls the supply of electrical power to the power-supply circuit 125.

The power-supply circuit 125 supplies electrical power to the function expansion cartridge 30 which is connected via the function expansion terminal 195 in accordance with the charge/discharge control circuit 120.

The microcomputer 130 operates in accordance with a timing signal of the oscillation circuit 180, and controls each section of the battery pack 10 in accordance with a control program and a control signal from the electronic device, which is sent via the communication circuit 150.

Furthermore, when the function expansion cartridge 30 is set in the function expansion terminal 195, the expansion function program, data, etc., provided by the function expansion cartridge 30 are read automatically or in accordance with a control signal from the image capturing device 20, these are sent to the image capturing device 20, and the function expansion cartridge 30 is made to perform a predetermined expansion function.

Furthermore, the microcomputer 130 controls processes for reading and writing data to and from the memory 140, and sends the battery cell information sent from the charge/discharge control circuit 120 to the image capturing device 20.

The memory 140 performs processes for reading and writing data from and to the loaded electronic device under the control of the microcomputer 130.

In a predetermined memory area of the memory 140, flag information (hereinafter referred to as "battery category information") indicating that the battery pack 10 is a battery category in which the function expansion cartridge 30 can be loaded to add functions to the electronic device is recorded. It is determined whether or not the battery pack is a battery pack compatible with device setting and recording type by detecting the battery category information by the electronic device side.

The memory 140 is configured so as to be capable of reading and writing the battery cell information together with the battery category information, so that the necessary memory area can be shared in the battery pack.

By configuring the memory 140 in such a manner that electrical power is supplied from the battery cell 110, a memory having a large storage capacity can be incorporated.

The communication circuit 150 performs a data communication process with the electronic device via the communication terminal 13 under the control of the microcomputer 130, so that the setting information and the battery cell information stored in the memory 140, and function expansion software (programs, data, etc.) sent from the function expansion cartridge 30 are sent to the electronic device, and data sent from the image capturing device 20 is transferred to the microcomputer 130.

The communication terminal 13 for transmitting and receiving data is configured so as to also serve as a communication terminal used to send the battery cell information in a conventional battery pack. Consequently, since a conventional battery-pack interface can also be used, this battery pack can also be used in a conventional electronic device.

The current detection circuit 160 detects the value of the electrical current applied to the battery cell 110 and sends the detected electrical current value to the charge/discharge control circuit 120.

The charge/discharge control switch 170 switches between charge and discharge of the battery cell 110 in accordance with the charge SW (switch) and the discharge SW under the control of the charge/discharge control circuit 120. The illustration of the charge/discharge control switch 170 is omitted in the block diagram of FIG. 3.

The oscillation circuit 180 generates a timing signal which serves as a reference for processing/control operations in the battery pack and supplies it to the microcomputer 130. The illustration of the oscillation circuit 180 is omitted in the block diagram of FIG. 3.

The thermistor 185 detects the temperature of the interior of the battery pack and sends the detected interior temperature data to the microcomputer 130. The illustration of the thermistor 185 is omitted in the block diagram of FIG. 3.

The external communication circuit 190 performs a data communication process with the function expansion cartridge 30 under the control of the microcomputer 130, so that the function expansion software (program, data, etc.) sent from the function expansion cartridge 30 is transferred to the microcomputer 130. Furthermore, the external communication circuit 190 sends a control signal sent from the microcomputer 130 to the function expansion cartridge 30.

The function expansion terminal 195 is an interface terminal with the function expansion cartridge 30, and is connected to the external communication circuit 190 and the power-supply circuit 125. Then, the function expansion terminal 195 is connected to the connection terminal 310 of the function expansion cartridge 30, so that data communication with the communication circuit 330 of the function expansion cartridge 30, and provision of electrical power to the power-supply circuit 320 of the function expansion cartridge 30 are performed.

A description will now be given below of the function expansion cartridge 30 shown in FIG. 3.

The function expansion cartridge 30 includes a connection terminal 310, a power-supply circuit 320, a communication circuit 330, a microcomputer 340, a memory 350, and so on.

The connection terminal 310 is an interface terminal with the battery pack 10, and is connected to the communication circuit 330 and the power-supply circuit 320. Then, the connection terminal 310 is connected to the function expansion terminal 195 of the battery pack 10, so that data communication with the external communication circuit 190 of the battery pack 10 and provision of electrical power to the power-supply circuit 320 are performed.

The power-supply circuit 320 supplies the electrical power supplied via the connection terminal 310 from the power-supply circuit 125 of the battery pack 10 to each section of the function expansion cartridge 30.

The communication circuit 330 performs a data communication with the battery pack 10 under the control of the microcomputer 340, so that software (program, data, etc.) for the purpose of expanding functions, possessed by the memory 350, is sent, and a control signal sent from the battery pack 10 is transferred to the microcomputer 340.

The microcomputer 340 has incorporated therein electronic circuits (hardware) for expanding the functions of the electronic device. The microcomputer 340 controls each section of the function expansion cartridge 30 in accordance with a control program and a control signal from the battery pack 10, which is sent via the communication circuit 330, and performs a predetermined expansion function.

Based on the control signal from the battery pack 10, the microcomputer 340 reads software (program, data, etc.) for expanding the functions of the electronic device (image capturing device 20), which is recorded in the memory 350, sends it to the communication circuit 330, and writes data sent via the communication circuit 330 in the memory 350.

Of course, the hardware, such as the electronic circuits for expanding the functions of the electronic device, may not be incorporated in the microcomputer, and may be provided as another circuit within the cartridge, so that the hardware is controlled by the microcomputer.

In the memory 350, a function expansion program and data for the electronic device (image capturing device 20) are stored, and the stored program and data are read and transferred to the microcomputer 340 under the control of the microcomputer 340.

For example, when the function expansion cartridge 30 is a cartridge for adding a wireless communication function and when the battery pack 10 in which the function expansion cartridge 30 is set is loaded into the image capturing device 20, a program, data, etc. for performing wireless communication are read from the memory 350 and are sent to the image capturing device 20. Thus, the image capturing device 20 can perform the wireless communication function of the function expansion cartridge 30 on the basis of the program, the data, etc.

A description will now be given of the image capturing device 20 shown in FIG. 3.

The image capturing device 20, which is an electronic device, includes a power-supply circuit 210 and a main circuit 220 which operates by the power feed supplied from the power-supply circuit 210. The main circuit 220 includes an image capturing section 221, a signal processing circuit 222, a microcomputer 223, a memory 224, an operation section 225, a display section 226, a communication circuit 230, and so on.

The power-supply circuit 210 supplies the electrical power obtained from the power source, such as the battery pack 10, to the main circuit 220 via a plus (+) terminal 21 and a minus (−) terminal 22.

The image capturing section 221 of the main circuit 220 captures, under the control of the microcomputer 223, light from a subject to be photographed, converts it into a video signal, and sends it to the signal processing circuit 222.

The signal processing circuit 222 of the main circuit 220 performs, under the control of the microcomputer 223, predetermined signal processing, such as correction processing (correction processing of white balance, gradation, luminance, color, etc.), on a video signal sent from the image capturing section 221, and sends the result to the display section 226, etc.

The microcomputer 223 of the main circuit 220 controls each section of the main circuit 220 in accordance with a control program and operation information from the user, which is sent via the operation section 225.

Furthermore, the microcomputer 223 obtains the battery category information recorded in the memory 140 of the battery pack 10 via the communication circuit 230, and discriminates whether or not the battery pack 10 is compatible with device setting and recording type.

Furthermore, based on the function expansion program and data from the function expansion cartridge 30, which are obtained via the communication circuit 230, the microcomputer 223 controls each section of the device so as to perform the expansion function, and controls each section of the device so as to operate in synchronization with the function expansion cartridge 30 via the communication circuit 230.

Under the control of the microcomputer 223, the memory 224 of the main circuit 220 stores the device setting information obtained via the operation section 225, and the battery cell information and the device setting information obtained via the communication circuit 230, reads the data stored in the memory, and sends it to the microcomputer 223.

The operation section 225 of the main circuit 220 sends operation information, such as operation instructions to the device by user operation, to the microcomputer 223.

The display section 226 of the main circuit 220 displays, under the control of the microcomputer 223, a video signal from the signal processing circuit 222 and data from the microcomputer 223 on a liquid-crystal screen or an EVF (Electronic View Finder).

Under the control of the microcomputer 223, the communication circuit 230 of the main circuit 220 performs a data communication process with the battery pack 10 via a communication terminal 23, sends the data stored in the memory 224 to the battery pack 10, and transfers, to the microcomputer 223, a function expansion program, data, a control signal, and the battery cell information, which are sent from the battery pack 10.

Figure 5:
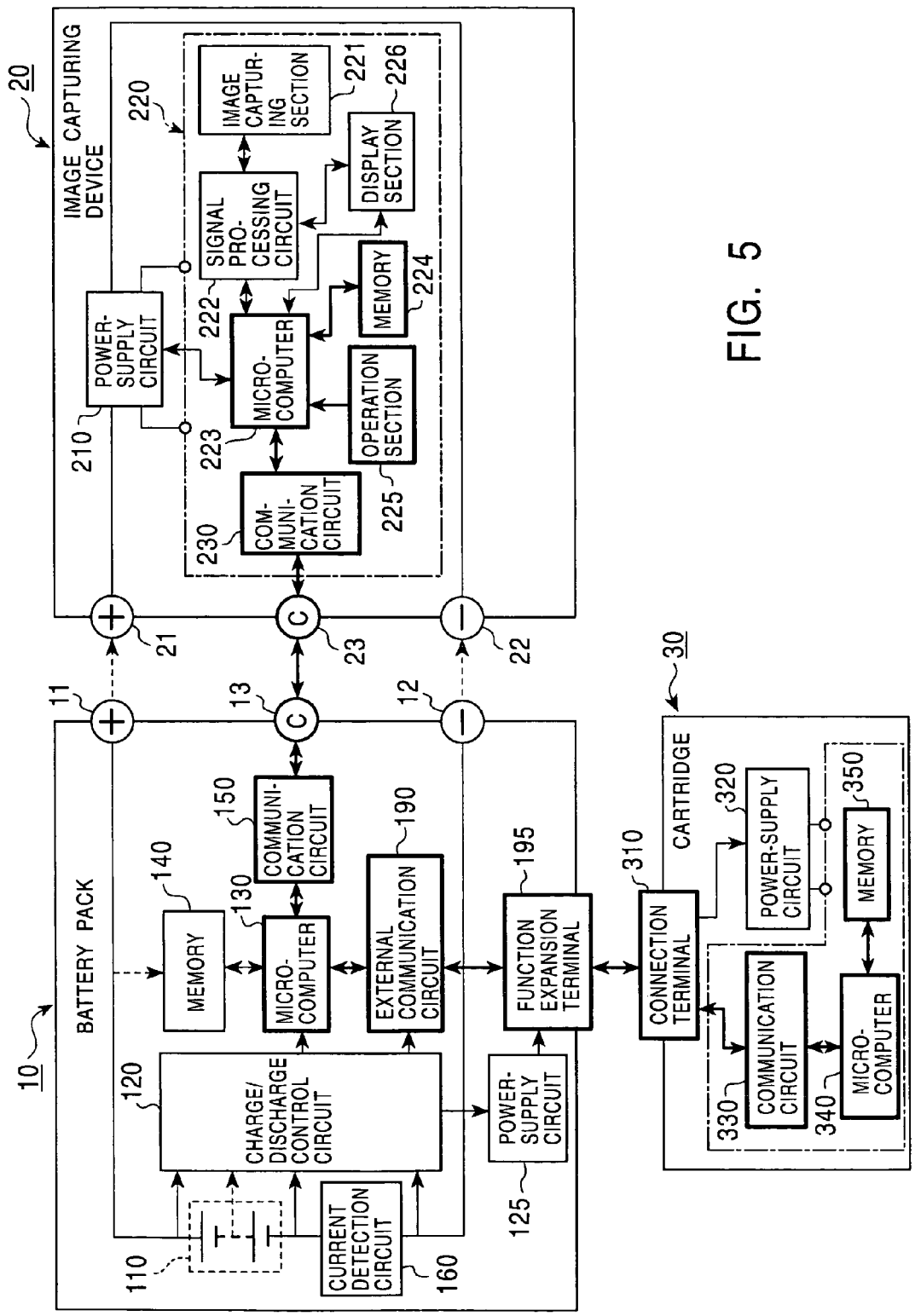
FIG. 5 is an illustration showing a communication path of data in the operation steps to be performed when the battery pack 10 is loaded into the image capturing device 20 (electronic device) in the block diagram shown in FIG. 2.
Figure 6:
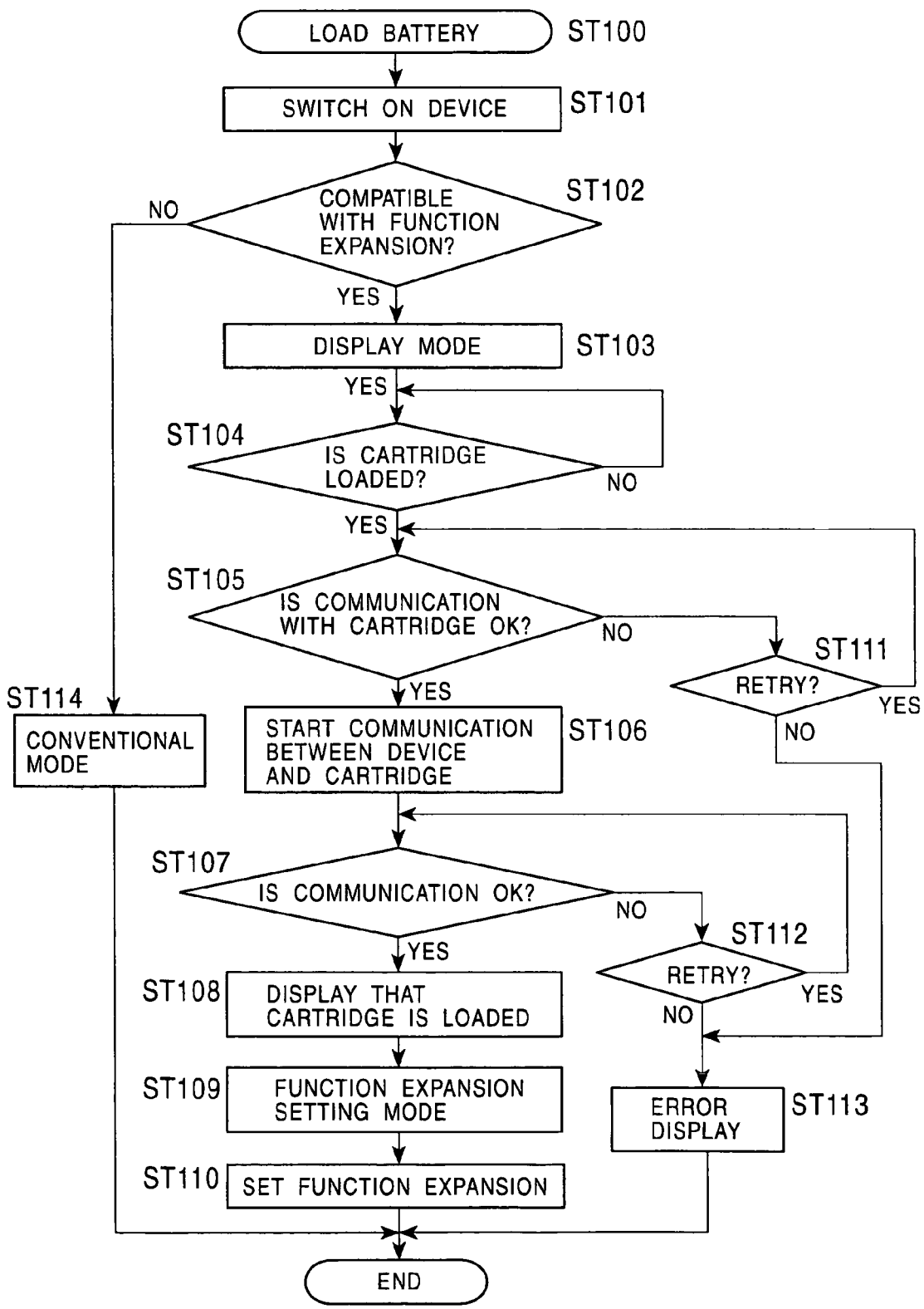
FIG. 6 is a flowchart showing operation steps to be performed in the illustration of FIG. 5.

Next, a description will now be given, with reference to the flowchart in FIG. 6, the operation steps to be performed when the battery pack 10 is loaded into the image capturing device 20 (electronic device) in the above-described configuration of FIG. 3. The portion indicated by the thick line and the thick frame in FIG. 5 indicates the communication path for each piece of information.

When the battery pack 10 is loaded into the image capturing device 20, the plus (+) terminal 11, the minus (−) terminal 12, and the communication terminal 13 of the battery pack 10 are connected to the plus (+) terminal 21, the minus (−) terminal 22, and the communication terminal 23 of the image capturing device 20, and the electrical power stored in the battery pack 10 is supplied to the image capturing device 20 (ST100).

When the power supply of the image capturing device 20 is turned on, a communication circuit 150 of the battery pack 10 and a communication circuit 230 of the image capturing device 20 start data communication via the communication terminal 13 and the communication terminal 23, respectively (ST101).

When the data communication with the image capturing device 20 is started, the microcomputer 130 of the battery pack 10 reads the battery category information set in the memory 140 and sends it to the image capturing device 20.

Furthermore, the microcomputer 130 of the battery pack 10 sends the battery category information and also sends the battery cell information collected by the charge/discharge control circuit 120 to the image capturing device 20. The battery cell information is sent via the communication terminal 13 through the communication circuit 150 in the same manner as for the battery category information.

Upon receiving the battery type information and the battery cell information sent from the battery pack 10, on the basis of this battery category information, the microcomputer 223 of the image capturing device 20 discriminates whether or not the battery pack is compatible with device setting and recording type (ST102).

When the battery category information indicates not compatibility with device setting and recording type, similarly to the conventional battery pack, based on the battery cell information sent from the battery pack 10, the microcomputer 223 of the image capturing device 20 displays the remaining battery level, the available operating time, etc., on the display section 226 (ST102→ST114).

When the battery category information indicates compatibility with device setting and recording type, the microcomputer 223 of the image capturing device 20 is placed in a function expansion mode for causing the device to operate with the functions expanded by the function expansion cartridge 30 (ST102→ST103).

Then, the microcomputer 130 of the battery pack 10 discriminates whether or not the connection terminal 310 of the function expansion cartridge 30 is connected to the external communication circuit 190 via the function expansion terminal 195, that is, discriminates whether or not the function expansion cartridge 30 is set in the battery pack 10 (ST104).

When the function expansion cartridge 30 is not set in the battery pack 10, the microcomputer 130 is placed in a state of waiting for detecting that the cartridge is set. When a predetermined time is elapsed or when another device operation is detected, the battery pack 10 operates as a battery pack of the "conventional mode" (ST104→ST114) (not shown).

When the function expansion cartridge 30 is set in the battery pack 10 or when it is detected that the function expansion cartridge 30 is set therein, the microcomputer 130 of the battery pack 10 discriminates whether or not data communication is possible with the communication circuit 330 of the function expansion cartridge 30 (ST104→ST105) When it is discriminated that the data communication with the communication circuit 330 of the function expansion cartridge 30 is not possible, the microcomputer 130 of the battery pack 10 performs a predetermined number of retries in order to reconfirm whether or not data communication is possible (ST105→ST111).

When the data communication with the function expansion cartridge 30 is not possible even if a predetermined number of retries are performed, the microcomputer 130 of the battery pack 10 sends an error signal indicating "data communication not possible" to the image capturing device 20. When the image capturing device 20 receives the error signal from the battery pack 10, the microcomputer 223 processes the error signal and performs an error display on the display section 226 (ST111→ST113) On the other hand, when the data communication with the communication circuit 330 of the function expansion cartridge 30 is possible, the microcomputer 130 of the battery pack 10 sends a control signal indicating that data communication can be started to both the image capturing device 20 and the function expansion cartridge 30 (ST105→ST106).

Upon receiving the control signal from the battery pack 10, the microcomputer 223 of the image capturing device 20 and the microcomputer 340 of the function expansion cartridge 30 start data communication with each other via the battery pack 10 (ST106).

Then, the image capturing device 20 and the function expansion cartridge 30 discriminates whether or not data communication is possible with the communication circuit 230 and with the communication circuit 330, respectively (ST107).

When any one of the microcomputer 223 of the image capturing device 20 and the microcomputer 340 of the function expansion cartridge 30 discriminates that data communication is not possible, the microcomputer 223 of the image capturing device 20 performs a predetermined number of retries in order to reconfirm whether or not data communication is possible (ST107→ST112).

Then, when the data communication with each other is not possible after a predetermined number of retries are performed, the microcomputer 223 of the image capturing device 20 performs an error display on the display section 226 (ST112→ST113).

Figure 7:
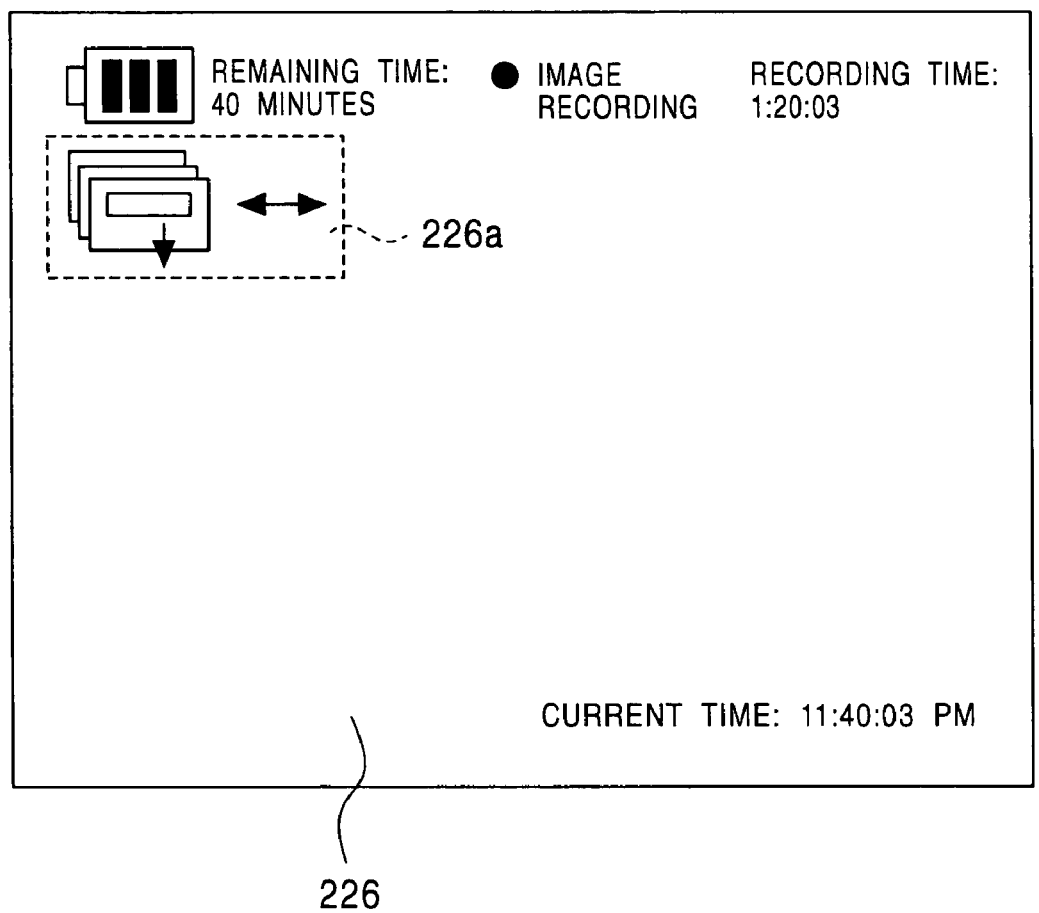
FIG. 7 is an illustration showing as an example a display section of the image capturing device 20 (electronic device)

On the other hand, when the data communication between the image capturing device 20 and the function expansion cartridge 30 is possible, the microcomputer 223 of the image capturing device 20 displays an icon 226a indicating that the battery pack is a battery pack compatible with device setting and recording type together with the information such as the remaining battery level, the recording time, and the current time on the display section 226 (an EVF, a liquid-crystal screen, etc.), as shown in, for example, FIG. 7 (ST107→ST108).

At this time, the microcomputer 340 of the function expansion cartridge 30 reads the expansion function information stored in the memory 350 and sends it to the battery pack 10.

Upon receiving the expansion function information sent from the function expansion cartridge 30, the battery pack 10 transfers it to the image capturing device 20.

Figure 8:
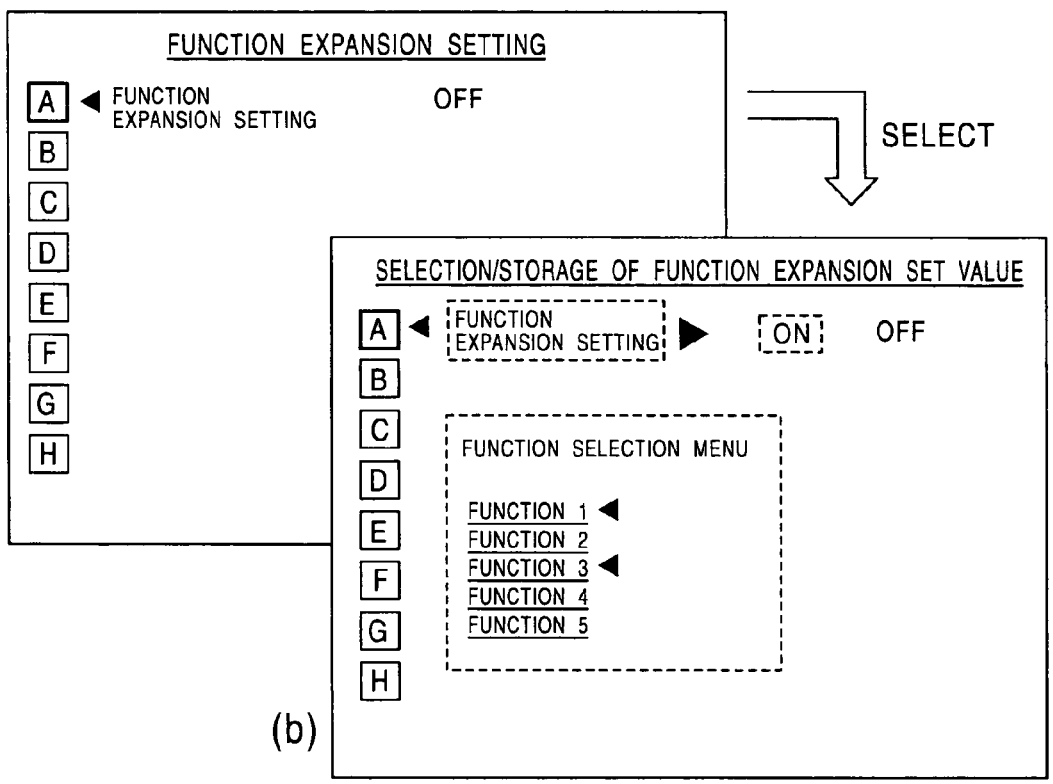
FIG. 8 is an illustration showing as an example a display section of the image capturing device 20 (electronic device) when function selection data is selected and set in the image capturing device 20 (electronic device).

Upon receiving the function selection data (function selection menu) of the function expansion cartridge 30, which is sent via the battery pack 10, the microcomputer 223 of the image capturing device 20 is placed in a function expansion setting mode, and based on the received function selection data (function selection menu), a screen for turning on/off the function expansion setting is displayed on the display section 226 as shown in, for example, part (a) of FIG. 8.

Then, when the function expansion setting is turned on by user operation via the operation section 225, as shown in, for example, part (b) of FIG. 8, a screen for function selection data (function selection menu) is displayed. When there are a plurality of expansion functions, a plurality of them are displayed, and when a desired expansion function is specified by user operation, the specified function selection data is sent to the battery pack 10.

Upon receiving the function selection data sent from the image capturing device 20, the battery pack 10 transfers it to the function expansion cartridge 30.

Upon receiving the function selection data sent from the image capturing device 20 via the battery pack 10, based on this function selection data, the microcomputer 340 of the function expansion cartridge 30 reads a function expansion program and data, which are recorded in the memory 350, and sends them to the battery pack 10.

Upon receiving the function expansion program and data sent from the function expansion cartridge 30, the battery pack 10 transfers them to the image capturing device 20.

Upon receiving the function expansion program and data sent via the battery pack 10, the microcomputer 223 of the image capturing device 20 stores the program and the data in the memory 224, expands the function, and performs a predetermined expansion function in accordance with them (ST110).

Upon receiving the function selection data sent from the image capturing device 20, the microcomputer 340 of the function expansion cartridge 30 controls the control circuit inside the function expansion cartridge 30 so as to perform a predetermined expansion function (ST110).

In this manner, the expansion function (hardware and software) of the electronic device can be added by the function expansion cartridge 30, the function expansion cartridge 30 is set in the battery pack, and this battery pack is loaded into the electronic device. Thus, the functions of the device can be expanded.

For example, when the function expansion cartridge 30 is a cartridge for adding a wireless communication function and when the battery pack 10 in which the function expansion cartridge 30 is set is loaded into the image capturing device 20, image data captured by the image capturing device 20 by the wireless communication function of the function expansion cartridge 30 can be sent to another device at a distant location.

What is claimed is:

1. A battery pack comprising:
   connection terminals, which are connected to an electronic device, for supplying electrical power to the device, and which are connected to a charger so as to charge the battery pack;
   a communication terminal for performing data communication with said electronic device;
   a cartridge insertion section to which a cartridge can be inserted,
   wherein the cartridge has a function expansion means for expanding a number and a type of functions of said electronic device;
   a function expansion terminal for connection with said cartridge inserted into said cartridge insertion section; and
   expansion function operation means for operating the function expansion means of said cartridge connected to said function expansion terminal in accordance with a control signal of said electronic device, which is sent via said communication terminal, thereby enabling an additional function of the electronic device,
   wherein the electronic device is placed in a function expansion mode upon receiving function selection data from the function expansion cartridge and displays the additional function in a function selection menu, and
   wherein when the communication terminal transfers expansion function information sent from the cartridge to the electronic device, the electronic device displays a first menu to a user for turning on/off a function expansion setting and further displays a second menu to the user for selecting an expansion function from a plurality of expansion functions.

2. A battery pack according to claim 1, wherein information on the electrical power capacity of the battery pack is transmitted via said communication terminal.

3. A function expansion cartridge which operates by being inserted into a slot provided in a battery pack which supplies electrical power to an electronic device and which is capable of data communication with the electronic device, said function expansion cartridge comprising:
   connection terminals for connection with predetermined terminals provided in the slot of said battery pack;
   communication means for performing data communication with said electronic device via said connection terminals;
   function expansion means having hardware and/or software for expanding a number and a type of functions of said electronic device; and
   expansion function control means for controlling said function expansion means in accordance with a control signal from said electronic device, which is sent via said communication means, thereby enabling an additional function of the electronic device,
   wherein the electronic device is placed in a function expansion mode upon receiving function selection data from the function expansion cartridge and displays the additional function in a function selection menu, and
   wherein when the communication means sends expansion function information to the electronic device through the batter pack, the electronic device displays a first menu to a user for turning on/off a function expansion setting and further displays a second menu to the user for selecting an expansion function from a plurality of expansion functions.

4. An electronic device comprising:
   connection terminals, which are connected to a battery pack through which electrical power is supplied; and
   a communication terminal, which is connected to said battery pack, the battery pack having a slot in which a function expansion cartridge having function expansion means for expanding a number and a type of functions of the main unit of the electronic device is inserted, the communication terminal being used for performing data communication between said battery pack and said function expansion cartridge,
   wherein each section of the main unit of the electronic device is controlled so as to perform an expansion function on the basis of a function expansion program and data from said function expansion cartridge, which are obtained via said communication terminal, thereby enabling an additional function of the electronic device, and
   wherein when the communication terminal receives expansion function information sent from the cartridge through the battery pack, the electronic device displays a first menu to a user for turning on/off a function expansion setting and further displays a second menu to the user for selecting an expansion function from a plurality of expansion functions.

5. An electronic device comprising:
   connection terminals, which are connected to a battery pack through which electrical power is supplied; and
   a communication terminal, which is connected to said battery pack, the battery pack having a slot in which a function expansion cartridge having function expansion means for expanding a number and a type of functions of the main unit of the electronic device is inserted, the communication terminal being used for performing data communication between said battery pack and said function expansion cartridge,
   wherein each section of the main unit of the electronic device is controlled so as to operate in synchronization with said function expansion cartridge via said communication terminal, thereby enabling an additional function of the electronic device, and
   wherein when the communication terminal receives expansion function information sent from the cartridge through the battery pack, the electronic device displays a first menu to a user for turning on/off a function expansion setting and further displays a second menu to the user for selecting an expansion function from a plurality of expansion functions.

6. A function expansion method for performing data communication between a battery pack and a function expansion cartridge by connecting, to an electronic device, the battery pack, the battery pack having a slot in which a function expansion cartridge having function expansion means for expanding a number and a type of functions of the main unit of the electronic device is inserted, said function expansion method comprising the step of:
   controlling each section of the main unit of the electronic device so as to perform an expansion function on the basis of a function expansion program and data from said function expansion cartridge, which are obtained through said data communication, thereby enabling an additional function of the electronic device, and
   wherein when the electronic device receives expansion function information sent from the cartridge through the battery pack, the electronic device displays a first menu to a user for turning on/off a function expansion setting and further displays a second menu to the user for selecting an expansion function from a plurality of expansion functions.

7. A function expansion method for performing data communication between a battery pack and a function expansion cartridge by connecting, to an electronic device, the battery pack, the battery pack having a slot in which a function expansion cartridge having function expansion means for expanding a number and a type of functions of the main unit of the electronic device is inserted, said function expansion method comprising the step of:
   controlling each section of the main unit of the electronic device so as to operate in synchronization with said function expansion cartridge through said data communication, thereby enabling an additional function of the electronic device, and
   wherein when the electronic device receives expansion function information sent from the cartridge through the battery pack, the electronic device displays a first menu to a user for turning on/off a function expansion setting and further displays a second menu to the user for selecting an expansion function from a plurality of expansion functions.

* * * * *